(12) United States Patent
Holmes et al.

(10) Patent No.: US 7,684,192 B2
(45) Date of Patent: **\*Mar. 23, 2010**

(54) APPARATUS FOR AIR COOLING OF AN ELECTRONIC DEVICE

(75) Inventors: Steven Holmes, Mountain View, CA (US); Douglas L. Heirich, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 4 days.

This patent is subject to a terminal disclaimer.

(21) Appl. No.: 12/277,879

(22) Filed: Nov. 25, 2008

(65) Prior Publication Data

US 2009/0141444 A1    Jun. 4, 2009

Related U.S. Application Data

(60) Continuation of application No. 11/742,485, filed on Apr. 30, 2007, now Pat. No. 7,466,547, which is a continuation of application No. 11/357,311, filed on Feb. 17, 2006, now Pat. No. 7,248,476, which is a division of application No. 10/815,488, filed on Mar. 31, 2004, now Pat. No. 7,035,102.

(60) Provisional application No. 60/535,279, filed on Jan. 8, 2004.

(51) Int. Cl.
*H05K 7/20* (2006.01)

(52) U.S. Cl. ............... 361/695; 361/690; 361/694; 174/16.1; 174/16.3; 165/104.33

(58) Field of Classification Search ......... 361/687–690, 361/694, 695; 174/16.1, 16.3; 165/80.3, 165/104.33, 122
See application file for complete search history.

(56) References Cited

U.S. PATENT DOCUMENTS

| | | |
|---|---|---|
| 4,501,460 A | 2/1985 | Sisler |
| 5,216,246 A | 6/1993 | Weldman et al. |
| 5,375,038 A | 12/1994 | Hardt |
| 5,412,534 A | 5/1995 | Cutts et al. |
| 5,452,181 A | 9/1995 | Hoover |
| 5,781,408 A | 7/1998 | Crane et al. |
| 5,822,186 A | 10/1998 | Bull et al. |
| 5,860,015 A | 1/1999 | Olson |
| 5,867,095 A | 2/1999 | Klein et al. |
| 5,918,188 A | 6/1999 | Doran |
| 5,963,424 A | 10/1999 | Hileman et al. |

(Continued)

OTHER PUBLICATIONS

Office Action dated Apr. 9, 2008 from U.S. Appl. No. 11/742,485.

(Continued)

*Primary Examiner*—Boris L Chervinsky
(74) *Attorney, Agent, or Firm*—Beyer Law Group LLP

(57) ABSTRACT

An apparatus for air-cooling an electronic device is disclosed. A contoured panel channels a flow of air within the housing of an electronic device so as to channel the flow of air more directly over heat producing elements such as the microprocessor and peripheral cards. A sensor can also be employed to determine whether the panel is present and properly placed. If not, measures can be taken to reduce the heat generated by the heat producing elements. For example, a warning can be displayed, or the microprocessor can be instructed to enter sleep mode.

15 Claims, 6 Drawing Sheets

U.S. PATENT DOCUMENTS

| | | | |
|---|---|---|---|
| 6,006,168 A * | 12/1999 | Schumann et al. | 702/132 |
| 6,018,456 A | 1/2000 | Young et al. | |
| 6,029,119 A | 2/2000 | Atkinson | |
| 6,031,719 A | 2/2000 | Schmitt et al. | |
| 6,049,973 A | 4/2000 | Frank, Jr. et al. | |
| 6,053,586 A | 4/2000 | Cook et al. | |
| 6,058,009 A | 5/2000 | Hood, III et al. | |
| 6,062,663 A | 5/2000 | You et al. | |
| 6,072,397 A | 6/2000 | Ostrowski | |
| 6,109,710 A | 8/2000 | We et al. | |
| 6,132,019 A | 10/2000 | Kim et al. | |
| 6,134,667 A * | 10/2000 | Suzuki et al. | 713/300 |
| 6,157,532 A | 12/2000 | Cook et al. | |
| 6,200,215 B1 | 3/2001 | Larson et al. | |
| 6,212,069 B1 | 4/2001 | Janik et al. | |
| 6,219,226 B1 | 4/2001 | Bullington et al. | |
| 6,257,682 B1 | 7/2001 | Liu et al. | |
| 6,259,352 B1 | 7/2001 | Yulkowski et al. | |
| 6,288,897 B1 | 9/2001 | Fritschle et al. | |
| 6,336,080 B1 | 1/2002 | Atkinson | |
| 6,356,435 B1 | 3/2002 | Davis et al. | |
| 6,359,214 B1 | 3/2002 | Worley et al. | |
| 6,362,958 B1 | 3/2002 | Yu et al. | |
| 6,366,832 B2 | 4/2002 | Lomonaco et al. | |
| 6,400,045 B1 | 6/2002 | Hosokawa et al. | |
| 6,407,910 B1 | 6/2002 | Diaz et al. | |
| 6,414,828 B1 | 7/2002 | Zimmerman et al. | |
| 6,430,041 B1 | 8/2002 | Johnson et al. | |
| 6,434,001 B1 | 8/2002 | Bhatia | |
| 6,459,574 B1 | 10/2002 | Ghosh | |
| 6,462,940 B1 | 10/2002 | Diaz et al. | |
| 6,472,779 B2 * | 10/2002 | Hwang et al. | 310/12.29 |
| 6,473,297 B1 | 10/2002 | Behl et al. | |
| 6,504,718 B2 | 1/2003 | Wu | |
| 6,522,535 B1 | 2/2003 | Helot et al. | |
| 6,532,151 B2 * | 3/2003 | Osecky et al. | 361/679.48 |
| 6,542,384 B1 | 4/2003 | Radu et al. | |
| 6,545,438 B1 * | 4/2003 | Mays, II | 318/400.01 |
| 6,556,437 B1 | 4/2003 | Hardin | |
| 6,574,102 B2 | 6/2003 | Usul et al. | |
| 6,587,342 B1 | 7/2003 | Hsu | |
| 6,595,605 B1 | 7/2003 | Babcock et al. | |
| 6,618,245 B2 | 9/2003 | Diaz | |
| 6,628,512 B2 | 9/2003 | Searby et al. | |
| 6,654,894 B2 | 11/2003 | Kaminski et al. | |
| 6,665,163 B2 | 12/2003 | Yanagisawa | |
| 6,678,157 B1 | 1/2004 | Bestwick | |
| 6,721,180 B2 | 4/2004 | Le et al. | |
| 6,775,144 B2 | 8/2004 | Gan et al. | |
| 6,795,314 B1 | 9/2004 | Arbogast et al. | |
| 6,816,391 B2 | 11/2004 | Davis et al. | |
| 6,822,863 B1 | 11/2004 | Artman et al. | |
| 6,824,174 B2 | 11/2004 | Lin et al. | |
| 6,932,447 B2 | 8/2005 | Chen et al. | |
| 6,935,130 B2 * | 8/2005 | Cheng et al. | 62/259.2 |
| 7,035,102 B2 | 4/2006 | Holmes et al. | |
| 7,061,761 B2 | 6/2006 | Tucker et al. | |
| 7,167,993 B1 * | 1/2007 | Thomas et al. | 713/322 |
| 7,242,576 B2 | 7/2007 | Coster et al. | |
| 7,248,476 B2 | 7/2007 | Holmes et al. | |
| 2003/0076652 A1 | 4/2003 | Ahn | |
| 2004/0022024 A1 | 2/2004 | Le et al. | |
| 2004/0085719 A1 | 5/2004 | Huang | |
| 2004/0196623 A1 | 10/2004 | Erickson et al. | |
| 2007/0201205 A1 | 8/2007 | Holmes et al. | |
| 2007/0242426 A1 | 10/2007 | Coster et al. | |

OTHER PUBLICATIONS

Press Release, "Apple Ships New Power Mac G5," Aug. 18, 2003, Cupertino, CA.

Office Action dated Sep. 26, 2007 from U.S. Appl. No. 11/742,485.

Notice of Allowance dated Aug. 18, 2008 in U.S. Appl. No. 11/742,485.

* cited by examiner

APPARATUS FOR AIR COOLING OF AN ELECTRONIC DEVICE

CROSS-REFERENCE TO RELATED APPLICATION

This application is a continuation of U.S. patent application Ser. No. 11/742,485 entitled "APPARATUS FOR AIR COOLING OF AN ELECTRONIC DEVICE," filed Apr. 30, 2007, which is a continuation of U.S. patent application Ser. No. 11/357,311 entitled "APPARATUS FOR AIR COOLING OF AN ELECTRONIC DEVICE," filed Feb. 17, 2006, which is a divisional of U.S. Pat. No. 7,035,102 entitled "APPARATUS FOR AIR COOLING OF AN ELECTRONIC DEVICE" filed Mar. 31, 2004, which in-turn claims the benefit of U.S. Provisional Application No. 60/535,279 entitled "QUICK RELEASE STRUCTURES FOR A COMPUTER," filed Jan. 8, 2004, all of which are incorporated herein by reference in their entirety and for all purposes.

BRIEF DESCRIPTION OF THE INVENTION

This invention relates to electronic devices. More specifically, this invention relates to the air cooling of electronic devices.

BACKGROUND OF THE INVENTION

As electronic devices increase in processing power and speed, their processors generate more and more heat, thus exacerbating wear and tear on various components due to thermal cycling and otherwise compromising their performance. Such temperature-related problems only continue to grow as processor speeds continue their steady march upward. The cooling of these processors, and other heat producing elements, has therefore become an important issue affecting the performance of modern electronic devices such as computers.

To this end, methods have been applied in the past to reduce the operating temperatures of electronic devices. For example, various liquid cooling systems have been employed to cool processors with water or other liquids. However, liquid cooling systems are typically bulky, expensive, and upon leaking, risk severe damage to the electronic devices in which they are installed. Fans for air cooling are another common solution to the problem of excessive heat generation. Such fans are an inexpensive and relatively reliable solution, and do not suffer from some of the drawback of liquid cooling systems, such as the risk of leaks. Ongoing efforts thus exist to improve the effectiveness and cooling ability of air cooling systems.

SUMMARY OF THE INVENTION

Broadly speaking, the invention pertains to improving the air cooling of electronic devices. A contoured panel is employed to channel the flow of air from a fan more directly onto an electronic device's sources of heat. In this manner, the heat dissipation ability of existing air cooling devices is increased without increasing their fan speeds, or any other parameters which may have potentially detrimental effects such as increased power consumption, noise generation, or the like.

The invention can be implemented in numerous ways, including as a method, system, device, apparatus, or computer readable medium. Several embodiments of the invention are discussed below.

As a contoured panel for directing a flow of air within an electronic device, one embodiment of the invention comprises a panel configured to be removably placed proximate to an electronic device, the electronic device having a heat producing element and a fan, the panel further having a contoured portion configured to be placed proximate to the fan so as to direct a flow of air from the fan across the heat producing element, the flow of air facilitating the cooling of the heat producing element.

As an air-cooled electronic device, one embodiment of the invention comprises a housing and a microprocessor and a fan within the housing. The panel is configured to be removably placed proximate to the housing. The panel also has a contoured portion configured to direct a flow of air from the fan across the microprocessor so as to cool the microprocessor.

As an electronic device housing, one embodiment of the invention comprises a first portion configured to support a microprocessor, and a second portion configured to support a first fan. A removable, contoured portion configured to direct air from the first fan across the microprocessor, so as to cool the microprocessor.

Other aspects and advantages of the invention will become apparent from the following detailed description taken in conjunction with the accompanying drawings which illustrate, by way of example, the principles of the invention.

BRIEF DESCRIPTION OF THE DRAWINGS

For a better understanding of the invention, reference should be made to the following detailed description taken in conjunction with the accompanying drawings, in which.

Like reference numerals refer to corresponding parts throughout the drawings.

DETAILED DESCRIPTION OF THE INVENTION

Fans are commonly used within electronic devices to direct a flow of air over microprocessors and other heat producing elements. In one embodiment, the invention discloses a contoured panel that channels this flow of air more directly over these elements. In this manner, the same fan, run at the same speed, more effectively cools microprocessors and other heat producing elements than if the panel were not present.

In some embodiments, it is of additional benefit to employ a sensor to determine whether the contoured panel is present and properly placed. If it is not, measures can then be taken to reduce the heat generated by the heat producing elements. For example, a warning can be displayed, or the microprocessor can be instructed to enter sleep mode.

Figure 1:
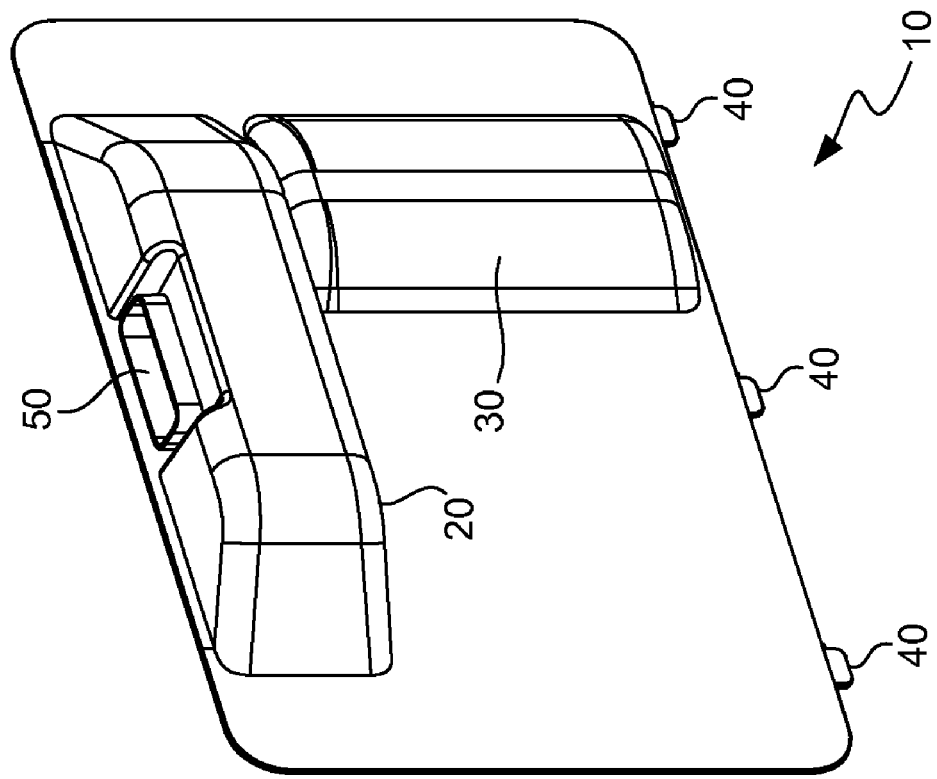
FIG. 1 illustrates a contoured panel constructed in accordance with an embodiment of the invention.
Figure 1:
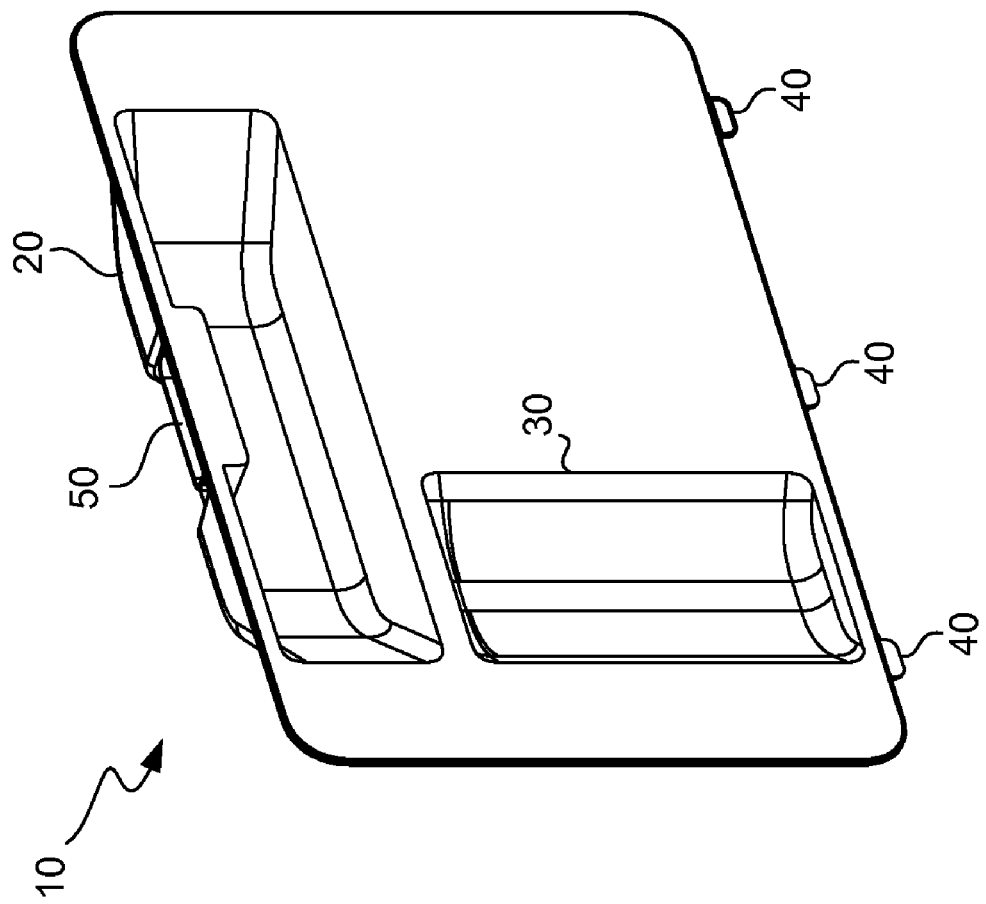

FIG. 1 illustrates isometric front and back views of a contoured panel constructed in accordance with an embodiment of the invention. The contoured panel 10 has a first contoured portion 20 and a second contoured portion 30, as well as tabs 40. The panel 10 is also configured with a handle 50 so as to be removable from a computer or other electronic device. In operation, the contoured panel 10 is placed proximate to fans within an electronic device, so that the contoured portions 20, 30 channel air from the fans more directly onto heat producing elements such as microprocessors. The handle 50 facilitates placement of the panel 10, and the panel 10 can be held in place with the aid of the tabs 40. The tabs 40 can also be employed to determine whether the panel 10 is in place, or missing/ajar. Sensors such as proximity sensors or optical sensors can be employed to determine the presence of the tabs 40. For example, the tabs 40 can be metallized so as to trigger proximity sensors or reflect light from an optical sensor, which then alerts the system to the presence or absence of the panel 10. If the panel 10 is absent, the electronic device can be designed to reduce its processing speed or otherwise conserve power so as to reduce its temperature.

Figure 2:
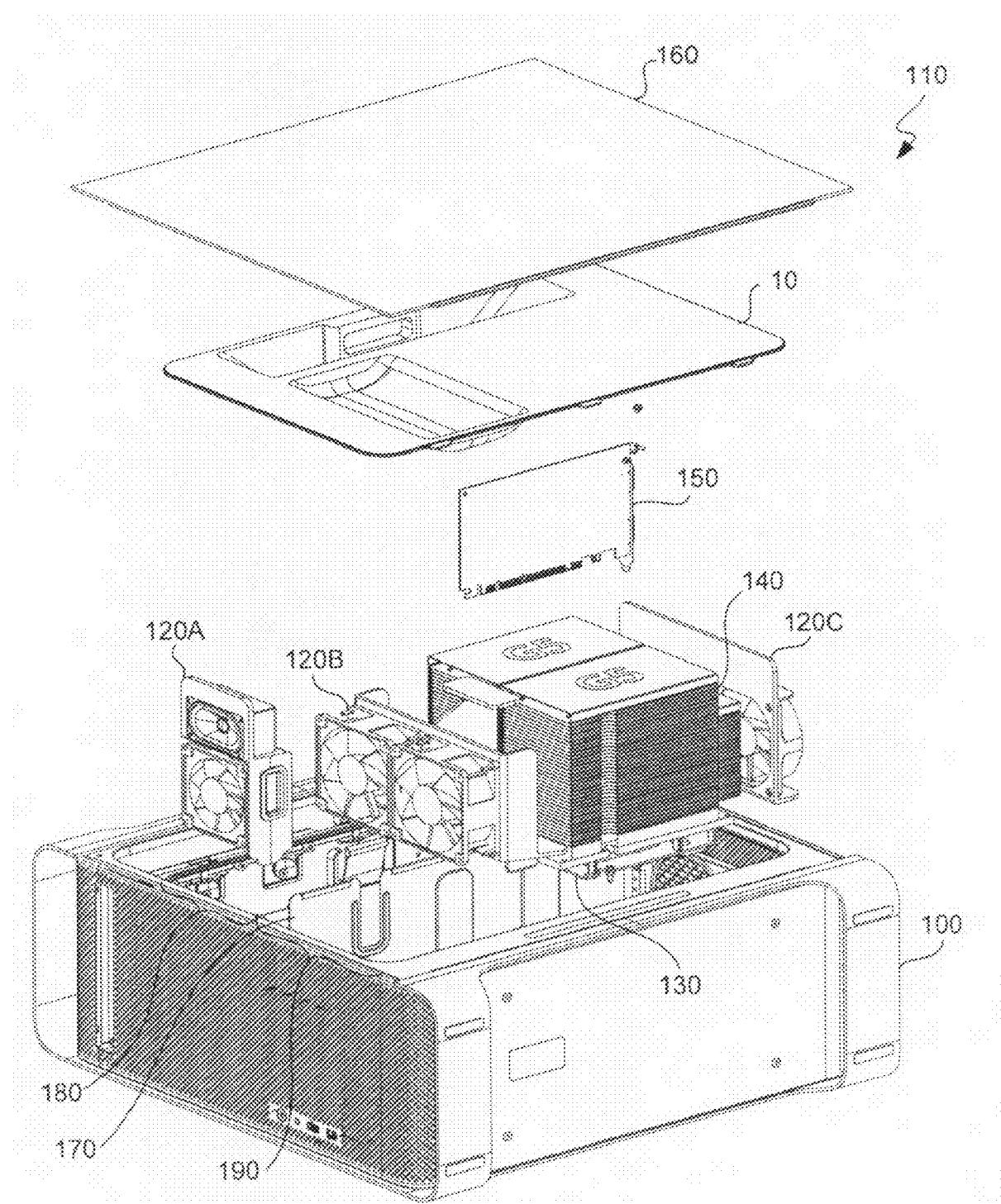
FIG. 2 illustrates a computer system with a removable contoured panel constructed in accordance with an embodiment of the invention.

FIG. 2 illustrates a computer system 110 employing such a contoured panel 10. Shown is an exploded view illustrating the placement of various components within the housing 100 of the computer system 110. The computer system 110 contains a number of known components such as fans 120 for cooling, a microprocessor 130 (not seen from this perspective), cooling fins 140 mounted on and configured to cool the microprocessor 130, and peripheral cards 150.

Commonly, the abovementioned components are placed in the housing 100 according to known techniques, and the panel 10 and door 160 are then affixed to the housing 100. A shelf 170 within the housing 100 is positioned so as to divide the housing 100 into, in this embodiment, at least two distinct thermal zones. The peripheral card 150 is placed within the first thermal zone 180, where it is cooled by the leftmost fan 120A. Similarly, the microprocessor 130 and cooling fins 140 are placed within the second thermal zone 190 where they are cooled by the rightmost fan 120B. Rear fans 120C, shown immediately behind the cooling fans 140, are not necessary to the invention but often aid in cooling by further drawing air across various components within the two thermal zones 180, 190. The fans 120A-C are shown as individual components, but can be configured as removable assemblies that can be placed at various points within the housing 100 so as to alter the location and properties of various thermal zones. For instance, it may sometimes be desirable to place certain fans closer to the microprocessor 130, or insert multiple fans into the same thermal zone, during times of heavy operation. One of skill will realize that the invention encompasses any number and type of fans, placed in any configuration within the various thermal zones.

Figure 3:
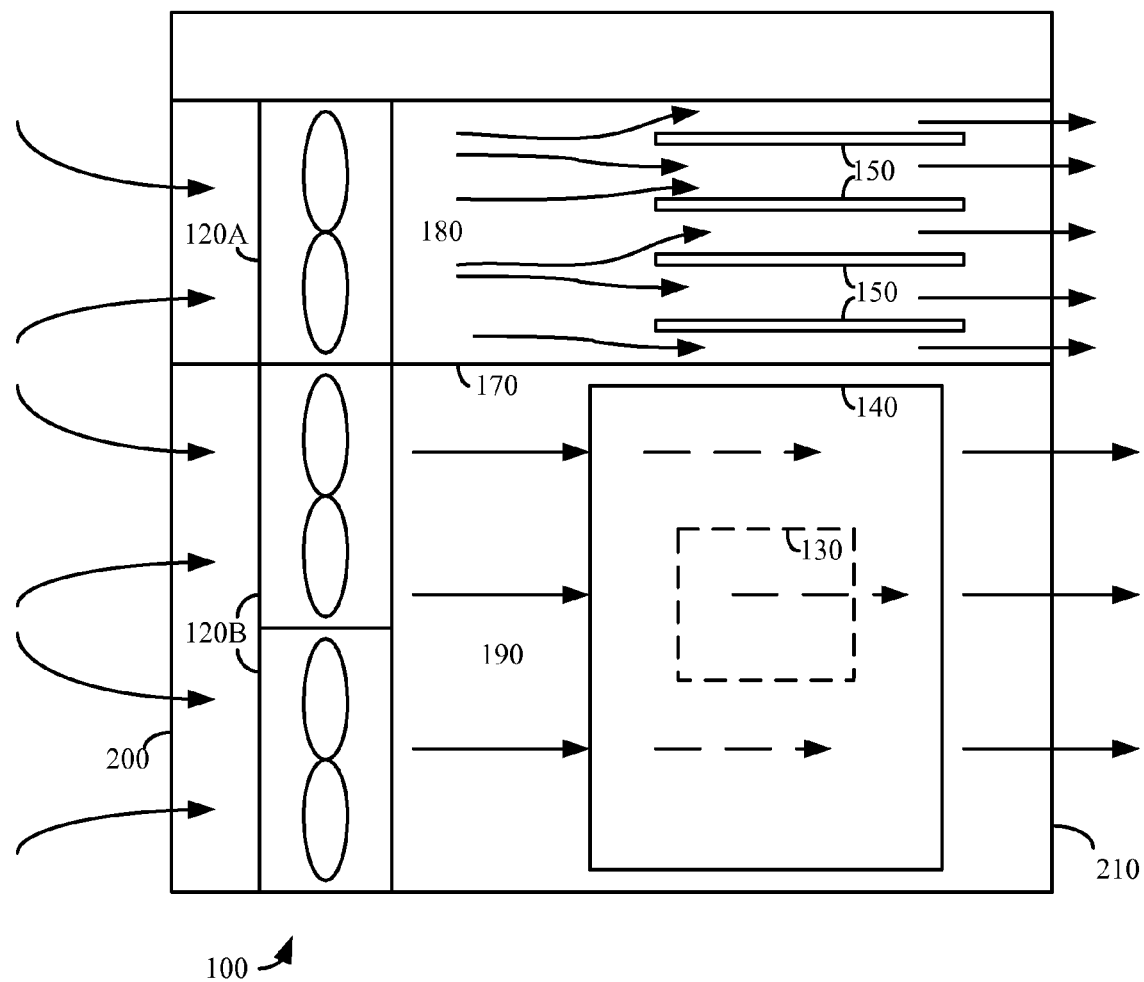
FIG. 3 illustrates a cross section of a computer system with discrete thermal zones constructed in accordance with an embodiment of the invention.

FIG. 3 illustrates a cross sectional view of the computer system 110 of FIG. 2, more clearly highlighting the two thermal zones 180, 190, and the air flow through each. Recall that the thermal zones 180, 190 are divided according to the shelf 170, which is placed so as to create separate thermal zones for the microprocessor 130 and peripheral cards 150, as the peripheral cards 150 often generate a different amount of heat than the microprocessor 130, and often can be cooled at different rates. It should be noted, though, that the shelf 170 can be placed at any location within the housing 100 so as to create thermal zones encompassing any combination or permutation of the microprocessor 130, peripheral cards 150, or other heat producing elements or components. For example, additional shelves can be placed above or below the thermal zones 180, 190 so as to further isolate various heat producing elements into separate thermal zones.

In the first thermal zone 180, a fan 120 directs a flow of air (shown by the arrows) past the peripheral cards 150. Often, microprocessors 130 consume more power and thus generate more heat than peripheral cards 150. Consequently, in the second thermal zone 190, two fans 120 direct a flow of air through the cooling fins 140 and over the microprocessor 130. Here, a dual microprocessor 130 configuration is shown containing two processors. Two fans are employed to reflect the extra cooling often required by this configuration. However, any number of cooling fans 120 can be used in any thermal zone. In each thermal zone, air enters and exits through known openings in the front panel 200 and rear panel 210, respectively.

Figure 4:
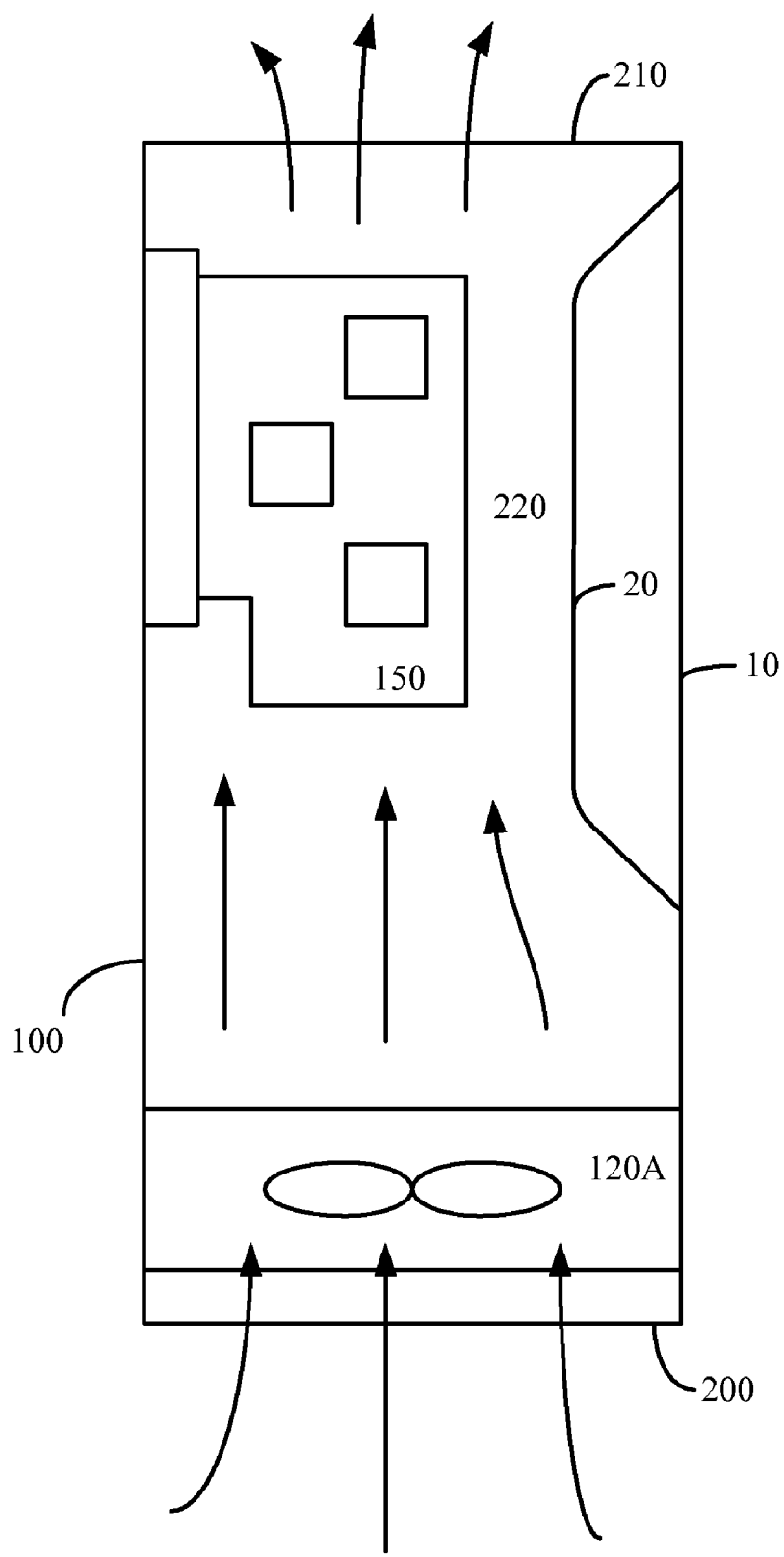
FIG. 4. illustrates a top view of a thermal zone and contoured panel constructed in accordance with an embodiment of the invention, in which peripheral cards are more effectively cooled.

In many computers, fans are already used to cool components such as the microprocessor 130. However, dividing the interior of the housing 100 into separate thermal zones 180, 190 allows for separate components to be cooled at different rates and/or maintained at different temperatures. The maintenance of separate thermal zones is further aided by the contoured panel 10, which is configured with contoured portions 20, 30 that can be specifically shaped for, and placed in, each thermal zone 180, 190. FIG. 4 illustrates a cutaway top view of the first thermal zone 180 with the panel 10 placed so as to direct the flow of air within. As can be seen, the fan 120 directs a flow of air into the housing 100 and through the first thermal zone 180. In many housings not containing a contoured portion 20, some of the air passes over the peripheral cards 150 (which contain heat producing elements such as dedicated processors that are simply another form of microprocessor 130), while some does not, often simply passing through the remaining space 220 where it does not help to cool the peripheral cards 150. However, the contoured portion 20 is designed to protrude into this remaining space 220, thus channeling the flow of air more directly over the peripheral card 150. For any constant fan 120 speed, one of skill will observe that air will flow over the peripheral card 150 faster in the presence of the contoured portion 120 than in its absence, as the contoured portion 20 reduces the area through which air may flow. Consequently, the ability of fans 120 to cool heat producing elements such as the peripheral card 150 is increased. As above, air may exit the housing 100 through any opening in the rear panel 210, and an additional fan 120 may be placed near the rear panel 210 so as to direct more air out of the housing and establish greater airflow through the first thermal zone 180.

Figure 5:
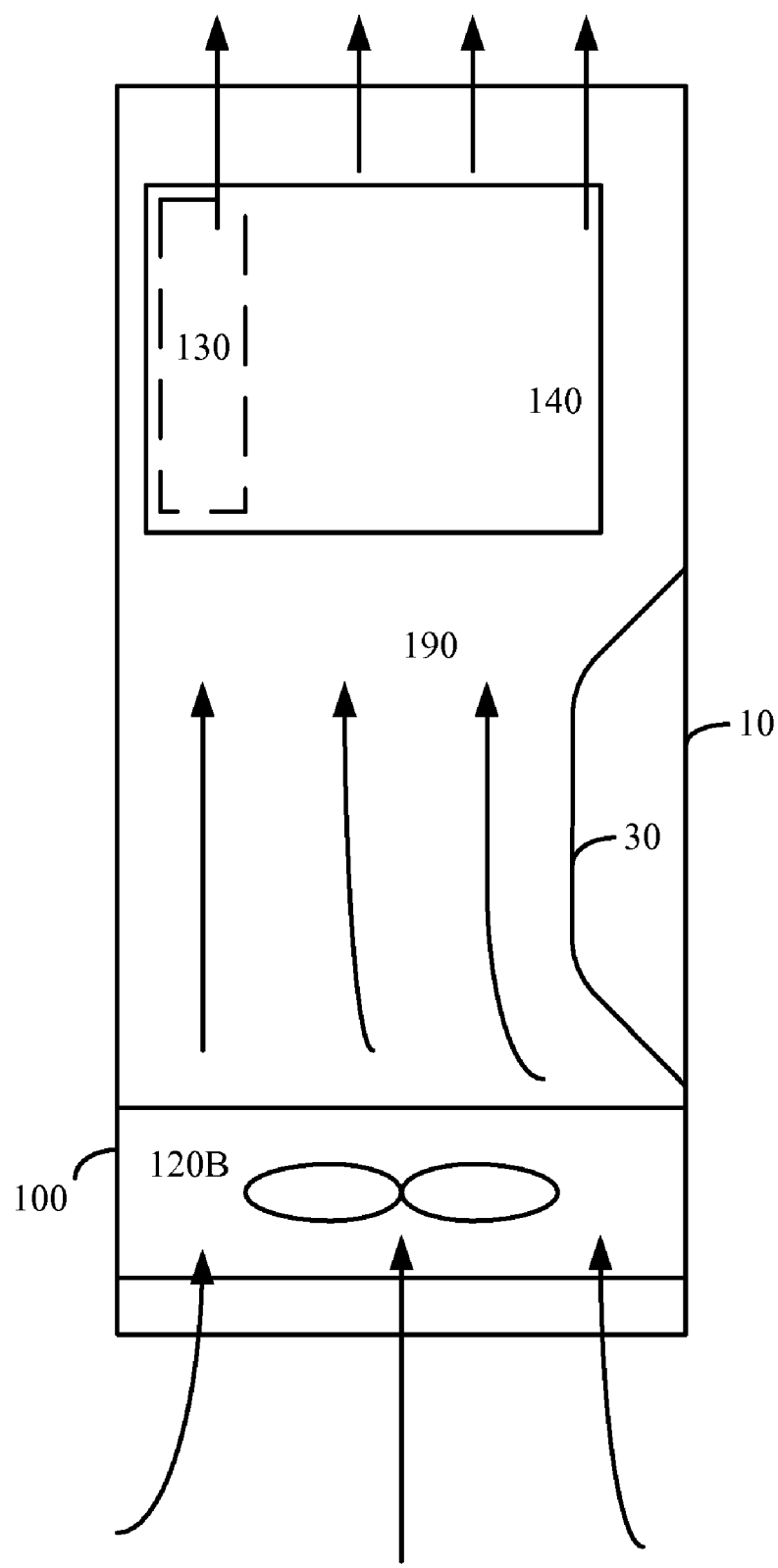
FIG. 5. illustrates a top view of a thermal zone and contoured panel constructed in accordance with an embodiment of the invention, in which a microprocessor is more effectively cooled.

Similar to FIG. 4, FIG. 5 illustrates a cutaway top view of the second thermal zone 190 with the panel 10 placed so that the second contoured portion 30 more effectively directs airflow across the microprocessor 130 and cooling fins 140. Here, the fan 120 directs a flow of air into the housing 100. The contoured portion 30 protrudes into the second thermal zone 190 so as to direct more of the airflow across the microprocessor 130 and through the cooling fins 140, thus better cooling these components.

The division of the housing 100 into multiple thermal zones, with contoured portions tailored to each, allows different components to be cooled at different rates if necessary. For example, it is possible for electronic devices to contain multiple microprocessors 130. In cases where such microprocessors 130 are all placed within a single thermal zone, it is often the case that that thermal zone generates much more heat than the others. The invention thus contemplates a contoured portion tailored to the demands of that thermal zone, configured so as to direct airflow over each microprocessor 130. In this regard, it should be observed that the invention includes panels having any number of contoured portions, each specifically tailored to direct airflow within any number of thermal zones that each having different cooling needs.

It will be apparent to one of skill that the specific geometry and placement of the contoured portions 20, 30 acts to more effectively direct air across components such as the peripheral card 150 and microprocessor 130. For example, the first contoured portion 20 is designed with a length that is as long or longer than many peripheral cards 150 so as to more effectively cool the entire length of the cards 150. However, it should be understood that the invention is not limited to the specific geometries and placements shown. For example, the invention contemplates contoured portions 20, 30 whose geometries are designed according to known principles for optimizing the cooling of heat producing elements within the space constraints of the housing 100. The invention simply discloses contoured portions of any specific geometry that acts to more directly channel a flow of air across a component of an electronic device. Space constraints, the location of other components, and the like may require that the contoured portions 20, 30 look different than shown, and those of skill will realize that such alternate configurations remain within the scope of the invention.

A further advantage of the invention can be achieved if the panel 10 is made of a transparent material, such as many commonly-used plastics. Once installed in the housing 100, such a transparent panel 10 would allow for visual inspection of various components of the computer system 110 without disturbing the flow of air through the various thermal zones, or alerting the system 110 to the absence of the panel 10. In this manner, visual inspections of the computer system 110 can be performed while still maintaining the added cooling of the panel 10.

Attention now turns to attachment of the panel 10 to the housing 100. It is beneficial to design the panel 10 to be easily removable so that the various components can be more effectively cooled without impeding access to the interior of the housing 100. It is also beneficial to determine whether the panel 10 is present and properly positioned, so as to determine the degree to which components such as the microprocessor 130 are cooled. Specifically, when the panel 10 is present, the microprocessor 130 may be operated at higher speeds, thus generating more heat, than if the panel 10 were absent.

Figure 6:
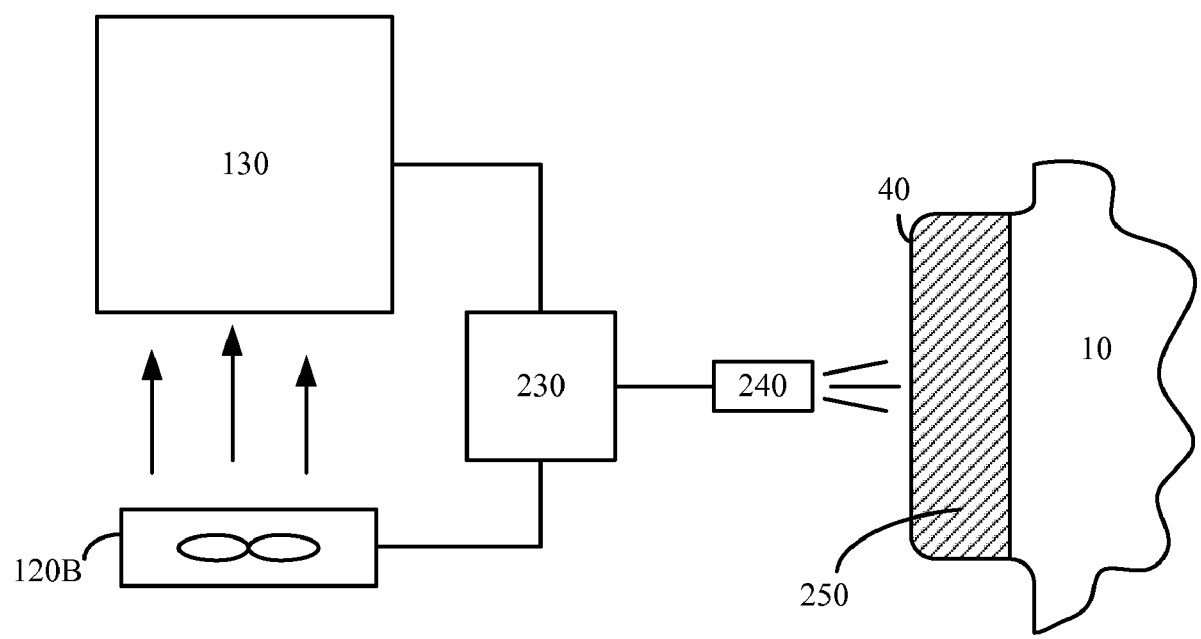
FIG. 6 illustrates a block diagram of a sensor and feedback system for determining whether a contoured panel is correctly positioned in accordance with an embodiment of the invention.

To that end, FIG. 6 illustrates a block diagram of a sensor and feedback system for determining whether a contoured panel is correctly positioned. A sensor 240 is located on or in the housing 110, and placed in electrical communication with a processor 230. The processor 230 is, in turn, in electronic communication with the microprocessor 130 and fan 120. The sensor 240 can be configured as a known optical sensor that emits a beam of light and receives a reflected signal back. In this configuration, the tabs 40 of the panel 10 are metallized reflective tabs capable of reflecting light (or another signal) back to the sensor 240 when they are properly positioned within the housing 110.

In operation, the panel 10 is designed so that its tabs 40 can be fitted within corresponding slots in the housing 100. The sensor 240 is commonly placed within the housing in proximity to these slots, so that when the panel 10 is properly fitted on the housing 100, the reflective portion 250 of its tabs 40 reflects light back to the sensor 240. The sensor 240 indicates the presence of a reflected light signal back to the processor 230. If the panel 10 is properly placed so as to aid in the cooling of components, normal operation of the microprocessor 130, fan 120, and other components ensues. However, the processor 230 can be programmed to act in a number of ways upon receiving an indication from the sensor 240 that the panel 10 is not properly placed. For instance, the processor 230 can be programmed to instruct the microprocessor 130 to issue a warning message to users indicating that the panel is missing and/or improperly placed, to enter sleep mode, to reduce its functionality or processing speed, or even to shut down. It can also direct the fan 120 to speed up. Many other variations exist, such as directing the microprocessor 130 to enter sleep mode after the panel 10 has been missing for an amount of time. One of skill will realize that these and other variations fall within the scope of the present invention, which simply discloses the sensing of the panel 10 and resulting control of the electronic device's functionality.

One of skill will also realize that the invention is not limited to the configuration of FIG. 6. Rather, other configurations are contemplated by the invention. For example, the microprocessor 130 can receive feedback directly from the sensor 240, without need for a dedicated processor 230 (in certain embodiments it is, of course, preferable to maintain a dedicated processor 230 to, for example, reduce the demands placed on the microprocessor 130). Such a microprocessor 130 configuration can also control the fan 120 directly. Likewise, the sensor 240 need not be an optical sensor, but rather another form of known proximity sensor such as a pressure sensor or capacitive proximity sensor. Finally, while the components and devices shown in FIG. 6 can often be placed within the housing 100, the invention does not require such an arrangement. Rather, components such as the sensor 240 may be located outside, or even remote from, the housing 100.

The foregoing description, for purposes of explanation, used specific nomenclature to provide a thorough understanding of the invention. However, it will be apparent to one skilled in the art that the specific details are not required in order to practice the invention. In other instances, well-known circuits and devices are shown in block diagram form in order to avoid unnecessary distraction from the underlying invention. Thus, the foregoing descriptions of specific embodiments of the present invention are presented for purposes of illustration and description. They are not intended to be exhaustive or to limit the invention to the precise forms disclosed. Obviously many modifications and variations are possible in view of the above teachings. For example, the invention contemplates panel contours of any shape suitable for cooling components of any geometry, within any number of thermal zones. The invention also contemplates determining the presence of panels according to signals from any known sensor, optical or otherwise. The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

What is claimed is:

1. A computing device having a heat producing element, a cooling fan adapted to generate airflow, and a contoured member configured to direct airflow from the cooling fan across the heat producing element, the computing device comprising:

a detection system configured to determine whether the contoured member is properly positioned relative to the computing device so as to provide a desired thermal condition inside the computing device, said detection system being further configured to generate an error signal when the contoured member is not properly positioned relative to the computing device, wherein said error signal is configured to facilitate a corrective action when said contoured member is not properly positioned relative to the computing device, and wherein said corrective action is associated with an adverse thermal condition resulting from an improperly positioned contoured member.

2. The computing device of claim 1, wherein said detection system includes a sensor adapted to detect the presence of the contoured portion.

3. The computing device of claim 2, wherein said sensor comprises an optical sensor configured to emit a beam of light and to detect a reflection of the beam of light so as to determine whether the contoured portion is properly positioned relative to the computing device, and wherein the contoured member comprises a reflective tab configured to reflect the beam of light back to the optical sensor when the contoured member is properly positioned.

4. The computing device of claim 2, wherein the detection system further includes a processor in communication with the sensor and adapted to receive the error message therefrom.

5. The computing device of claim 4, wherein the heat producing element comprises said processor.

6. The computing device of claim 4, wherein said processor is further adapted to transmit a warning message to a computing device user when it is determined that said contoured member is not properly positioned relative to the computing device.

7. The computing device of claim 4, wherein said processor is further adapted to increase the cooling rate of said cooling fan when it is determined that said contoured member is not properly positioned relative to the computing device.

8. The computing device of claim 4, wherein said processor is further adapted to reduce a processing speed of the heat producing element when it is determined that said contoured member is not properly positioned relative to the computing device.

9. The computing device of claim 4, wherein said processor directs said cooling fan to increase its speed when said contoured portion is removed from its position relative to the computing device and to decrease its speed when said contoured portion is replaced back to its position relative to the computing device.

10. The computing device of claim 1, wherein said contoured member comprises a removable contoured panel.

11. A method of cooling a computing device having a heat producing element, a cooling fan, an airflow director and a sensor, the method comprising:
    initiating the motion of said cooling fan to produce an airflow when said heat producing element is producing heat;
    determining with said sensor whether said airflow director is properly positioned proximate to the computing device, whereby a proper positioning of said airflow director results in a more efficient cooling of said heat producing element and an improper positioning of said airflow director results in a less efficient cooling of said heat producing element; and
    generating an error signal when said airflow director is not properly positioned proximate to the computing device.

12. The method of claim 11, further including the step of:
    increasing the cooling rate of said cooling fan when it is determined that said airflow director is not properly positioned proximate to the computing device.

13. The method of claim 11, further including the step of:
    decreasing the processing speed of said heat producing element when it is determined that said airflow director is not properly positioned proximate to the computing device.

14. The method of claim 11, further including the step of:
    permitting a higher processing speed of said heat producing element when it is determined that said airflow director is properly positioned proximate to the computing device.

15. The method of claim 11, further including the step of:
    transmitting a warning message to a computing device user when it is determined that said airflow director is not properly positioned proximate to the computing device.

* * * * *